(12) United States Patent
Awad et al.

(10) Patent No.: US 8,521,881 B2
(45) Date of Patent: Aug. 27, 2013

(54) RESOURCE ALLOCATION

(75) Inventors: Yassin Aden Awad, Tokyo (JP); Robert Arnott, Tokyo (JP)

(73) Assignee: NEC Corporation, Tokyo (JP)

( * ) Notice: Subject to any disclaimer, the term of this patent is extended or adjusted under 35 U.S.C. 154(b) by 319 days.

(21) Appl. No.: 12/735,631

(22) PCT Filed: Jan. 22, 2009

(86) PCT No.: PCT/JP2009/051391
§ 371 (c)(1),
(2), (4) Date: Aug. 4, 2010

(87) PCT Pub. No.: WO2009/098987
PCT Pub. Date: Aug. 13, 2009

(65) Prior Publication Data
US 2010/0312894 A1    Dec. 9, 2010

(30) Foreign Application Priority Data

Feb. 5, 2008   (GB) .................................... 0802117.2

(51) Int. Cl.
*G06F 15/173*       (2006.01)
*H04W 4/00*         (2009.01)

(52) U.S. Cl.
USPC ........................................... 709/226; 370/329

(58) Field of Classification Search
USPC .......................... 709/223–226; 370/328–330
See application file for complete search history.

(56) References Cited

U.S. PATENT DOCUMENTS

| 7,885,230 B2* | 2/2011 | Seo et al. ....................... 370/329 |
| 2007/0242636 A1 | 10/2007 | Kashima et al. |
| 2008/0192847 A1* | 8/2008 | Classon et al. ................. 375/260 |
| 2009/0245193 A1* | 10/2009 | Gaal et al. ...................... 370/329 |
| 2010/0062782 A1* | 3/2010 | Higuchi et al. ............... 455/450 |
| 2011/0065468 A1* | 3/2011 | Parkvall et al. ............... 455/509 |

FOREIGN PATENT DOCUMENTS

| CN | 101102142 A | 1/2008 |
| JP | KR A | 8/2007 |
|    | 10-2007-0082569 | |
| KR | 10-2007-0082569 A | 8/2007 |
| WO | WO 2007/082754 A1 | 7/2007 |
| WO | WO 2007/094628 A1 | 8/2007 |
| WO | WO 2007/131413 A1 | 11/2007 |
| WO | WO 2008/000116 A1 | 1/2008 |
| WO | WO 2008/009027 A2 | 1/2008 |

OTHER PUBLICATIONS

Korean Office Action dated Aug. 9, 2011, with English translation.
Korean Office Action dated Dec. 12, 2011, with English translation.

(Continued)

*Primary Examiner* — Chirag R Patel
(74) *Attorney, Agent, or Firm* — McGinn IP Law Group, PLLC

(57) ABSTRACT

A mobile telecommunications system is described in which a base station allocates each mobile telephone a plurality of physical resource blocks by signalling data identifying a virtual resource block. The virtual resource block is mapped onto the plurality of physical resource blocks using stored mapping data. The mapping data is such that the mapped physical resource blocks are spaced over the operating bandwidth and all belong to the same resource block group subset.

19 Claims, 8 Drawing Sheets

(56) References Cited

OTHER PUBLICATIONS

TSG-RAN WG1#48, R1-070874, NEC Group, NTT DoCoMo: "Downlink Distributed Resource Block Mapping," St. Louis, Missouri, USA, Feb. 12-16, 2007, pp. 1-9.

3GPP RAN WG1 Meeting #49bis, R1-072946, NTT DoCoMo, Fujitsu, KDDI, Sharp, Toshiba Corporation: "RB-level Distributed Transmission Method for Shared Data Channel in E-UTRA Downlink," Orlando, USA, Jun. 25-29, 2007, pp. 1-6.

TSG-RAN WG1#48, R1-070881, NEC Group, NTT DoCoMo: "Uplink Resource Allocation for E-UTRA," St. Louis, Missouri, USA, Feb. 12-16, 2007, pp. 1-4.

TSG-RAN WG1#49Bis, R1-072826, NEC Group: "DL Distributed Resource Signalling for EUTRA," Orlando, USA, Jun. 25-29, 2007, pp. 1-7.

3GPP TSG RAN1 #51, R1-074602, Motorola: "Downlink VRB email reflector summary," Jeju, Korea, Nov. 5-9, 2007, pp. 1-3.

R1-075056, NEC, Panasonic, Ericsson, Motorola, Nokia, NTT DoCoMo, Qualcomm, LG, Mitsubishi: "Way forward Resource allocation for Compact DL grant," 6.2.3.

3GPP TSG RAN1#51bis, R1-080571: "Outcome of ad hoc discussions on VRB Agenda Item: 6.1.5.," Discussion Moderator (Motorola), Sevilla, Spain, Jan. 14-18, 2008, pp. 1-3.

3GPP TS 36.213 V8.1.0, Technical Specification 3rd Generation Partnership Project; Technical Specification Group Radio Access Network; Evolved Universal Terrestrial Radio Access (E-UTRA); Physical layer procedures (Release 8), Nov. 2007, pp. 1-7.

TSG-RAN WG1 LTE Ad Hoc, R1-060095, Ericsson: "E-UTRA DL-Localized and distributed transmission," Helsinki, Finland, Jan. 23-25, 2006.

Japanese Office Action dated May 30, 2012.

Chinese Office Action dated Aug. 23, 2012.

Ericsson, "E-UTRA DL-Location and distributed transmission", 3GPP TSG-RAN WG1 LTE Ad hoc R1-060095, Helsinki, Finland, Jan. 23-25, 2006 (previously submitted on Aug. 4, 2010).

Chinese Office Action dated Apr. 1, 2013, with English-language translation of the Search report attached to the Office Action.

Motorola, Downlink Resource Allocation Mapping for E-UTRA, 3GPP TSG RAN1 #50 R1-073372, Aug. 20-29, 2007.

\* cited by examiner

RESOURCE ALLOCATION

TECHNICAL FIELD

The present invention relates to the allocation of resources within a communication system. The invention has particular, although not exclusive relevance to the allocation of virtual resource blocks (VRBs) in an orthogonal frequency divisional multiple access (OFDMA) communication system.

BACKGROUND ART

OFDMA and single carrier FDMA have been selected as the downlink and uplink multiple access schemes for the E-UTRA air interface currently been studied in 3GPP (which is a standard based collaboration looking at the future evolution of third generation mobile telecommunication systems). Under the E-UTRA system, a base station which communicates with a number of mobile telephones allocates the total amount of time/frequency resource (depending on bandwidth) among as many simultaneous users as possible, in order to enable efficient and fast link adaptation and to attain maximum multi-user diversity gain. The resource allocated to each mobile telephone is based on the instantaneous channel conditions between the mobile telephone and the base station and is informed through a control channel monitored by the mobile telephone.

DISCLOSURE OF THE INVENTION

Problems to be Solved by the Invention

To benefit from the advantages of frequency diversity the time frequency resources allocated to a particular mobile telephone may be distributed across the bandwidth supported by that device.

In order to take advantage of frequency diversity an efficient mechanism for allocating resources across the supported bandwidth is required.

Means for Solving the Problems

According to an aspect of the present invention there is provided a method of allocating resources in a communication system which uses a plurality of sub-carriers arranged sequentially across an operating bandwidth wherein adjacent blocks of said sequence are arranged in groups, the method comprising: determining at least one virtual resource block for allocation to a communications device; signalling data for identifying a virtual resource block to said mobile communications device; and mapping the allocated virtual resource block, using mapping data, onto a plurality of spaced physical resource blocks to determine the physical resource blocks to be used for communications; wherein said mapping data is such that said mapping step causes the spacing between the mapped physical resource blocks to be an integer multiple of the square of the number of physical resource blocks in each group.

In another aspect of the invention there is provided a method performed by a mobile communications device which operates in a communication system that uses a plurality of sub-carriers arranged in a sequence of physical resource blocks, wherein adjacent blocks of said sequence are arranged in groups, the method comprising: receiving data identifying one or more virtual resource blocks allocated to the mobile communications device; and mapping each allocated virtual resource block, using predetermined mapping data, onto a plurality of spaced physical resource blocks to determine the physical resource blocks to be used for communications with a base station; wherein said predetermined mapping data is such that said mapping step causes the spacing between the mapped physical resource blocks to be an integer multiple of the square of the number of physical resource blocks in each group.

In another aspect of the invention there is provided a mobile communications device which operates in a communication system that uses a plurality of sub-carriers arranged in a sequence of physical resource blocks, wherein adjacent blocks of said sequence are arranged in groups, the mobile communications device comprising: means for receiving data identifying one or more virtual resource blocks allocated to the mobile communications device; and means for mapping each allocated virtual resource block, using predetermined mapping data, onto a plurality of spaced physical resource blocks to determine the physical resource blocks to be used for communications with a base station; wherein said predetermined mapping data is such that said mapping means causes the spacing between the mapped physical resource blocks to be an integer multiple of the square of the number of physical resource blocks in each group.

In another aspect of the invention there is provided a method performed by a communications device which operates in a communication system that uses a plurality of sub-carriers arranged in a sequence of physical resource blocks, wherein adjacent blocks of said sequence are arranged in groups, the method comprising: obtaining data identifying one or more allocated virtual resource blocks; and mapping each allocated virtual resource block, using predetermined mapping data, onto a plurality of spaced physical resource blocks to determine the physical resource blocks to be used for communications; wherein said predetermined mapping data is such that said mapping step causes the spacing between the mapped physical resource blocks to be an integer multiple of the square of the number of physical resource blocks in each group.

In one embodiment the predetermined mapping data defines the spacing to be a function of the number of physical resource blocks represented by the virtual resource block. In this or another embodiment the spacing may be function of the number of physical resource blocks in said sequence.

In another embodiment the predetermined mapping data represents an equation for the spacing, for example:

$$gap = \left\lfloor \frac{G}{Nd} \right\rfloor * P^2$$

$$\text{where } G = \left\lceil \frac{N_{RB}^{DL}}{P^2} \right\rceil$$

where gap is the spacing, P is the number of physical resource blocks in each group, Nd is the number of physical resource blocks which the virtual resource block represents, $N_{RB}^{DL}$ is the number of physical resource blocks in the sequence, $\lfloor \ \rfloor$ is the floor function and $\lceil \ \rceil$ is the ceiling function. The predetermined mapping data may define a look-up table, for example, in which the results of the above equation and/or other parameters may be stored for quick reference without having to apply the equation directly.

In another embodiment the signalled data represents an index of the allocated virtual resource block which is equivalent an index of a physical resource block to be used for a first part of a sub-frame. The predetermined mapping data may defines an equation for the location of a further physical resource block to be used for a further part of the sub-frame for example:

$$I_{PRB}=(x+(q-1)*\text{gap})\bmod Nd*\text{gap}$$

where $I_{PRB}$ is the index of the further physical resource block, x is the index of the first physical resource block, gap is the spacing, Nd is the number of physical resource blocks which the virtual resource block represents, and q equals two for a second part of the sub-frame and three for a third part of the sub-frame.

BRIEF DESCRIPTION OF THE DRAWINGS

These and various other aspects of the invention will become apparent, from the following detailed description of embodiments which are given by way of example only and which are described with reference to the accompanying drawings in which.

BEST MODE FOR CARRYING OUT THE INVENTION

Overview

Figure 1:
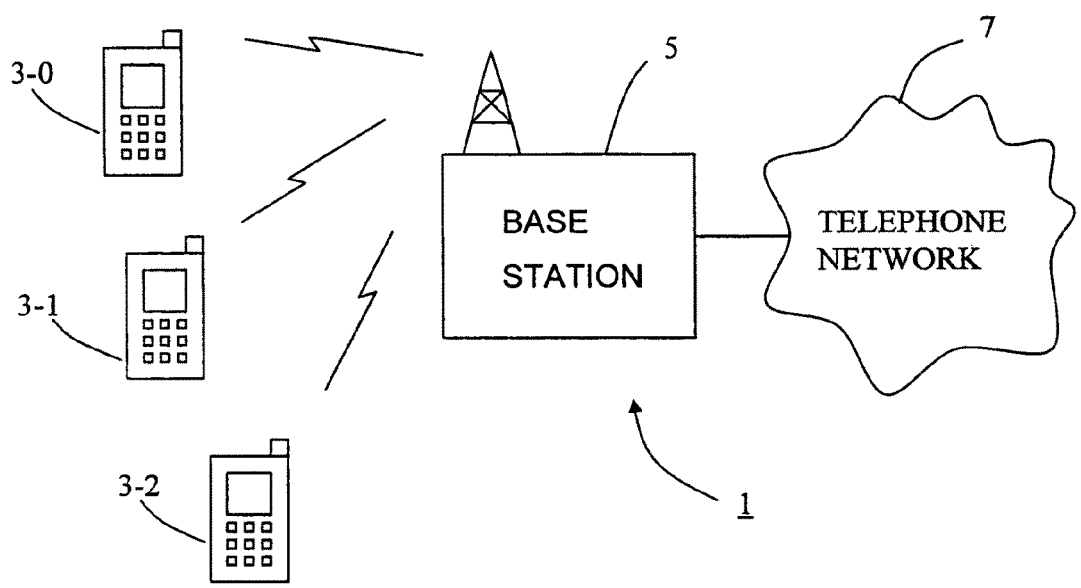
FIG. 1 schematically illustrates a communication system comprising a number of user mobile (cellular) telephones which communicate with a base station connected to the telephone network.

FIG. 1 schematically illustrates a mobile (cellular) telecommunication system 1 in which users of mobile telephones 3-0, 3-1, and 3-2 can communicate with other users (not shown) via a base station 5 and a telephone network 7. In this embodiment, the base station 5 uses an orthogonal frequency division multiple access (OFDMA) technique in which the data to be transmitted to the mobile telephones 3 is modulated onto a plurality of sub-carriers. Different sub-carriers are allocated to each mobile telephone 3 depending on the supported bandwidth of the mobile telephone 3 and the amount of data to be sent to the mobile telephone 3. In this embodiment the base station 5 also allocates the sub-carriers used to carry the data to the respective mobile telephones 3 in order to try to maintain a uniform distribution of the mobile telephones 3 operating across the base station's bandwidth. To achieve these goals, the base station 5 dynamically allocates sub-carriers for each mobile telephone 3 and signals the allocations for each time point (sub-frame) to each of the scheduled mobile telephones 3.

Figure 2:
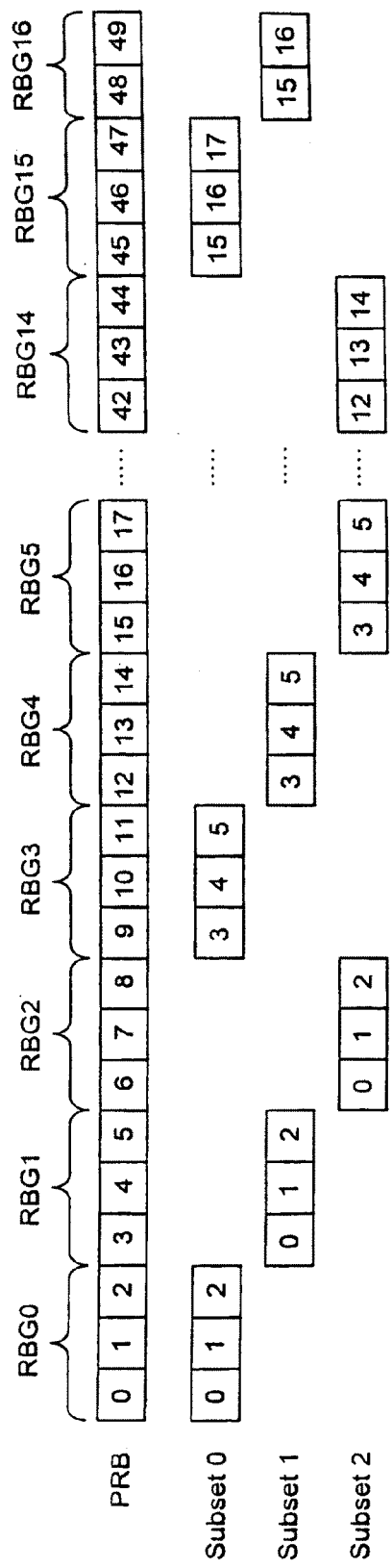
FIG. 2 illustrates how a communication bandwidth of 10 MHz is arranged in a plurality of physical resource blocks, resource block groups and resource block group subsets.

FIG. 2 illustrates how a bandwidth may conceptually be divided up into resource blocks, resource block groups and resource block group subsets. In FIG. 2, the sub-carriers have been arranged in a continuous sequence of physical resource blocks (PRBs) (each including the same number of sub-carriers) across the part of supported bandwidth used for data transmission.

The physical resource blocks are grouped into a plurality of consecutive resource block groups (RBGs). Where possible each group contains an equal number of resource blocks known as the RBG size although where the number of consecutive blocks is not exactly divisible by the desired RBG size the last group may contain fewer resource blocks.

For example, in FIG. 2 the supported bandwidth is 10 MHz of which 9 MHz is used for data transmission. The 9 MHz is divided into fifty resource blocks. The fifty resource blocks are grouped into seventeen resource block groups each of the first sixteen of which (RBG0 to RBG15) contains three resource blocks (RBG size=3) and the last of which (RBG16) contains two resource blocks.

The physical resource blocks are indexed consecutively across the bandwidth (typically from zero to forty-nine for 10 MHz).

The resource block groups are further arranged into a plurality subsets each of which includes a plurality of resource block groups distributed evenly across the bandwidth. The number of RBG subsets for a particular bandwidth and the spacing between resource block groups within the subset are both equal to the RBG size.

By way of illustration, in the example of FIG. 2 the seventeen resource block groups are allocated into three (i.e. the RBG size for 10 MHz) groups. The first subset contains the first, fourth, seventh, tenth, thirteenth and sixteenth groups. Similarly, the second subset contains the second, fifth, eighth, eleventh, fourteenth and seventeenth groups and the third subset contains the remaining groups.

A similar approach is used for dividing up different supported bandwidths. The RBG size (and hence number of subsets) for the different bandwidth is illustrated in the table below:

| System bandwidth, MHz | $N_{RB}^{DL}$ | P |
| --- | --- | --- |
| 1.4 | 6 | 1 |
| 3 | 15 | 2 |
| 5 | 25 | 2 |
| 10 | 50 | 3 |
| 15 | 75 | 4 |
| 20 | 100 | 4 |

Where 'P' is the RBG size (and hence the number of RBG subsets) and $N_{RB}^{DL}$ is the number of resource blocks into which the bandwidth is divided for downlink transmission.

As will be described in more detail below, in this embodiment, the base station 5 allocates each mobile telephone 3 a plurality of physical resource blocks by signalling data identifying a virtual resource block. The virtual resource block is mapped onto the plurality of physical resource blocks using stored mapping data (which may, for example, define an equation and/or a look up table). The mapping data is such that the mapped physical resource blocks are spaced over the operating bandwidth and all belong to the same RBG subset.

Base Station

Figure 3:
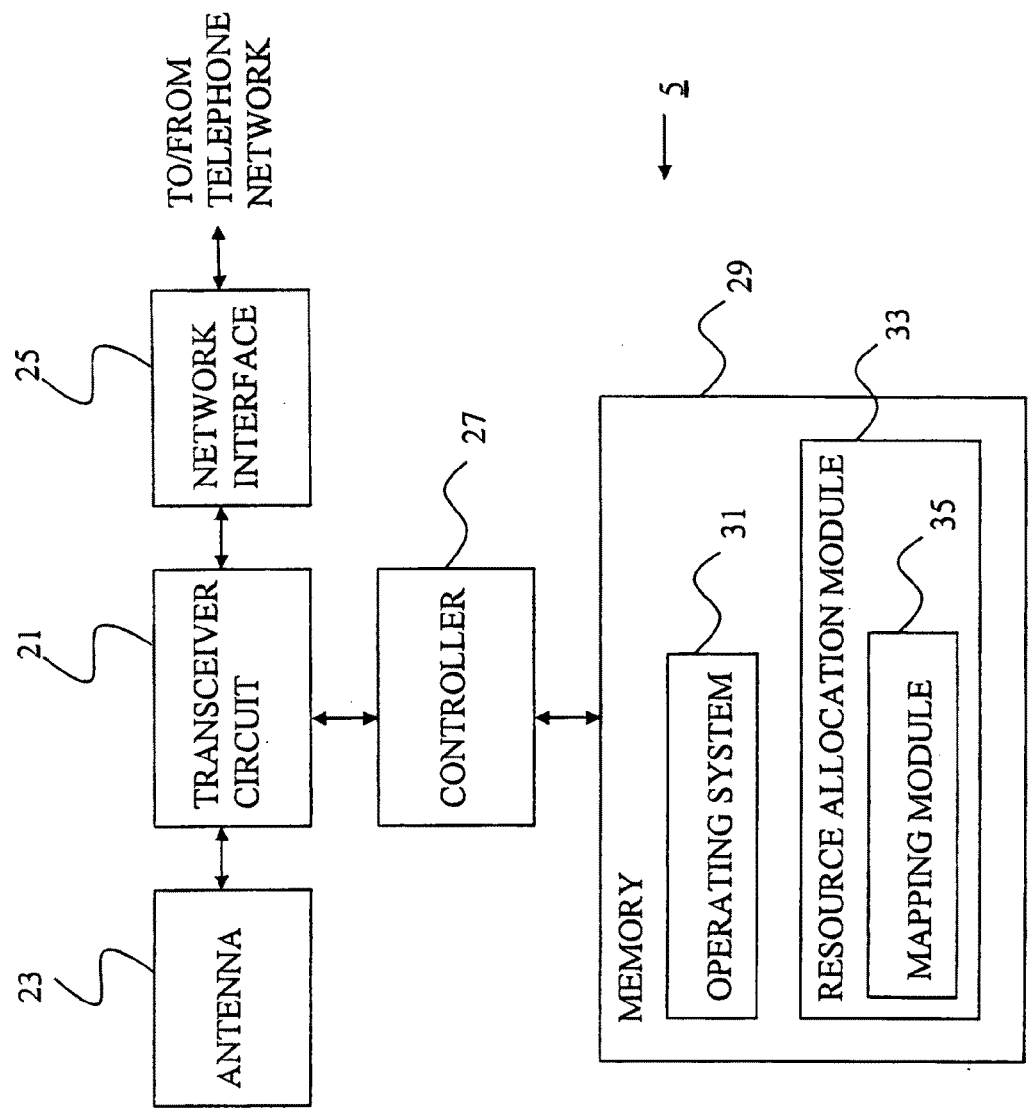
FIG. 3 is a block diagram illustrating the main components of the base station shown in FIG. 1.

FIG. 3 is a block diagram illustrating the main components of the base station 5 used in an embodiment of the invention. As shown, the base station 5 includes a transceiver circuit 21 which is operable to transmit signals to and to receive signals from the mobile telephones 3 via one or more antennae 23 (using the above described sub-carriers) and which is operable to transmit signals to and to receive signals from the telephone network 7 via a network interface 25. The operation of the transceiver circuit 21 is controlled by a controller 27 in accordance with software stored in memory 29. The software includes, among other things, an operating system 31 and a resource allocation module 33. The resource allocation module 33 is operable for allocating the resources used by the transceiver circuit 21 in its communications with the mobile telephones 3. As shown in FIG. 3, the resource allocation module 33 also includes a mapping module 35 for mapping resource allocations onto the physical resources allocated for data communication with respective mobile telephones.

In this embodiment the resource allocation module 33 of the base station is configured for allocating non-consecutive physical resource blocks from different locations in the supported bandwidth to a mobile telephone as at least one distributed virtual resource block (DVRB). The mapping module 33 of the resource allocation module is configured to map each distributed virtual resource block onto the actual physical resource blocks it represents using a predetermined mapping, thereby allowing communication using the allocated physical resources.

Figure 4A:
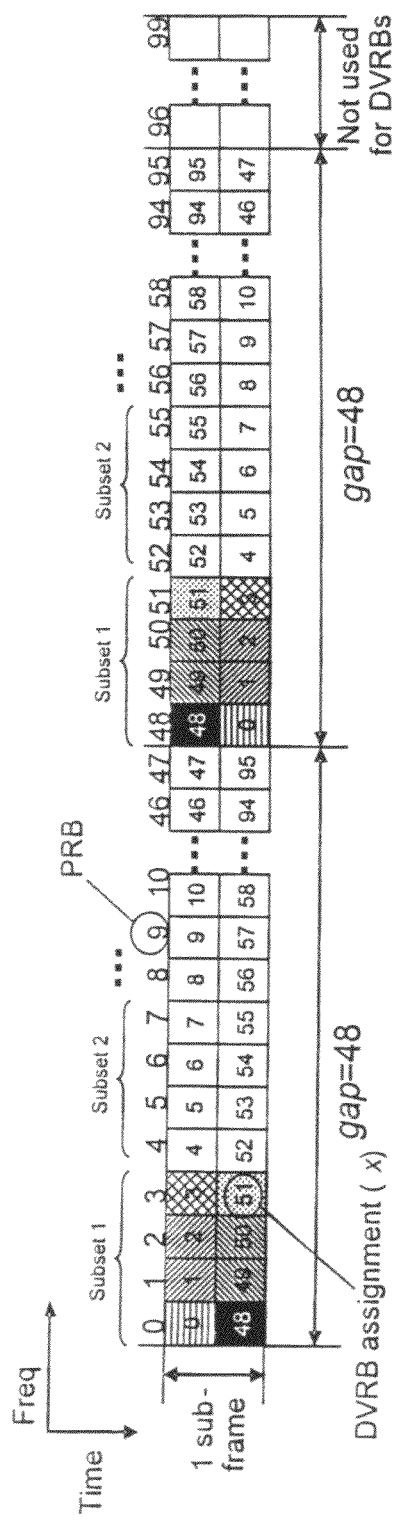
FIG. 4A illustrates the way in which distributed pairs of physical resource blocks within a 20 MHz band can be mapped onto corresponding virtual blocks.
Figure 4B:
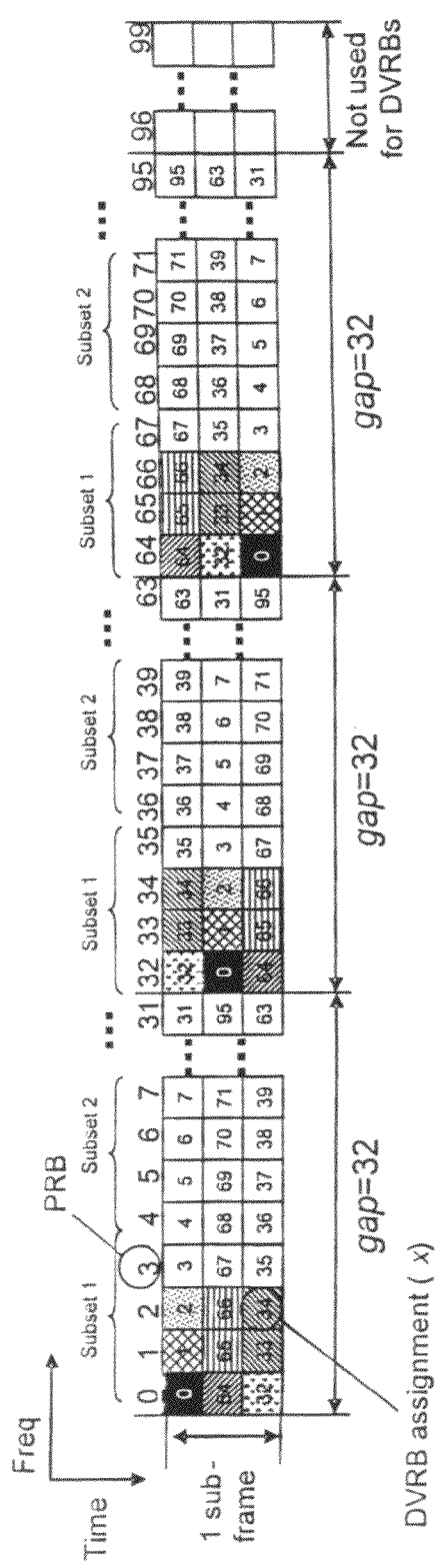
FIG. 4B illustrates the way in which distributed triplets of physical resource blocks within a 20 MHz band can be mapped onto corresponding virtual blocks.

Each distributed virtual resource block represents either two physical resource blocks (a DVRB-pair) as illustrated in FIG. 4A or three equally spaced physical resource blocks (a DVRB-triplet) as illustrated in FIG. 4B.

The actual physical resource blocks which a virtual resource block represents depend on the number of physical resource blocks Nd the virtual resource block represents, the number of physical resource blocks in the supported bandwidth $N_{RB}^{DL}$, and the RBG size 'P' for the supported bandwidth.

The DVRB-pair (Nd=2) or DVRB-triplet (Nd=3) of physical resource blocks allocated to a particular mobile telephone has an index which is equal to the index of the physical resource block of that DVRB-pair or DVRB-triplet to be used for transmission of a first part of a sub-frame. The physical resource block of the virtual resource block to be used for transmission of a second part of the sub-frame is cyclically spaced from the first by a gap comprising a defined number of physical resource blocks. In the case of a DVRB-triplet the physical resource block of the virtual resource block to be used for transmission of a third part of the sub-frame is cyclically spaced from the second by the same gap. In the case of Nd=2 the cyclical spacing is relative to twice the gap size. In the case of Nd=3 the similar cyclical spacing applies but relative to three times the gap size.

More specifically, and as shown in FIG. 4A, for distributed virtual resource blocks representing two physical resource blocks (Nd=2), if a mobile telephone is assigned a DVRB-pair $x_2$, then the two (Nd) corresponding physical resource blocks are located at a physical resource block index $x_2$ and $(x_2+gap) \bmod 2*gap$.

Similarly, for distributed virtual resource blocks representing three physical resource blocks (Nd=3), if a mobile telephone is assigned a DVRB-triplet $x_3$, then the three (Nd) corresponding physical resource blocks are located at physical resource block index $x_3$, $(x_3+gap) \bmod 3*gap$ and $(x_3+2*gap) \bmod 3*gap$.

The gap is defined to ensure that each physical resource block of a particular virtual resource block is located at the same relative position in its respective resource block group. Furthermore, the gap is defined to ensure that the physical resource blocks of a particular DVRB-pair or DVRB-triplet are all located within the same Resource Block Group subset for a given mobile telephone. It should be noted, however, that according to this embodiment, it is still possible for different mobile telephones to be allocated in different subsets using distributed transmission.

To ensure that these conditions are met, the gap values are defined as integer multiples of the square of the RBG size ($P^2$) as follows:

$$gap = \left\lfloor \frac{G}{Nd} \right\rfloor * P^2$$

$$\text{where } G = \left\lceil \frac{N_{RB}^{DL}}{P^2} \right\rceil.$$

As defined previously, 'P' is the RBG size (and hence the number of RBG subsets), Nd is the number of physical resource blocks which the virtual resource block represents, and $N_{RB}^{DL}$ is the number of physical resource blocks in the supported bandwidth. $\lfloor r \rfloor$ is the floor function, i.e. the largest integer not greater than r, and $\lceil q \rceil$ is the ceiling function i.e. the smallest integer not less than q.

The gap as defined by this equation for different system bandwidths is illustrated in the table below:

| System bandwidth, MHz | $N_{RB}^{DL}$ | P | gap (Nd = 2) | gap (Nd = 3) |
|---|---|---|---|---|
| 1.4 | 6 | 1 | 3 | 2 |
| 3 | 15 | 2 | 8 | 4 |
| 5 | 25 | 2 | 12 | 8 |
| 10 | 50 | 3 | 27 | 18 |
| 15 | 75 | 4 | 32 | 16 |
| 20 | 100 | 4 | 48 | 32 |

The resource allocation module 33 of the base station 5 is configured to assign a distributed virtual resource block to each mobile telephone 3 as an index value x in the range 0 to Nd*gap−1. The value x indicates the physical resource block in which the mobile telephone 3 should transmit the first part of the sub-frame. The second part of the sub-frame (and third part in the case of Nd=3) may be found by applying offsets of gap to x as described previously.

The base station 5 is configured to signal this index value the mobile telephone 3 to which the corresponding distributed virtual resource block is allocated. The number (Nd) of physical resource blocks which the distributed virtual resource block represents is also signalled, typically on a broadcast channel.

The mapping module 35 is arranged to map the allocated distributed virtual resource block for a particular mobile telephone 3 onto the actual physical resource blocks required for communication of each part of the sub-frame and to configure the base station 5 for communication with that mobile telephone 3 using the identified physical resource blocks. Similarly, the mobile telephone 3 is configured to determine which physical resource block should be used to receive the first, second and third parts of the sub-frame (in the case of Nd=3) from the index x and the value of gap calculated using the above equation (or derived from an appropriate lookup table).

The base station 5 can also allocate contiguous blocks of distributed virtual resource blocks to a given mobile telephone 3, in which case the corresponding physical resource blocks can be obtained by applying the method described above to each of the assigned distributed virtual resource block. Where a contiguous virtual resource blocks this may be signalled to the mobile telephone either as separate virtual resource blocks or by signalling data which can be mapped onto the allocated virtual resource blocks using a suitable function, equation or lookup table.

In the case that $N_d\text{gap}<N_{RB}^{DL}$, the physical resource blocks having indexes $N_d\text{gap}$ to $N_{RB}^{DL}-1$ are not used for distributed transmission. Furthermore, in the case that $N_d\text{gap}>N_{RB}^{DL}$, the base station 5 does not allocate distributed virtual resource blocks that would result in the condition (x mod gap)+$(N_d-1)\text{gap}<N_{RB}^{DL}$ not being satisfied.

FIGS. 4a and 4b show an example for Nd=2 and Nd=3 respectively where the supported bandwidth is 20 MHz. On these figures, different hatching represents the assignment for different mobile telephones, for distributed transmission. It is clear from the assignments shown in FIGS. 4a and 4b that all the physical resource blocks allocated to a particular mobile telephone 3 are in the same resource block group subset at different parts of the bandwidth for Nd=2 and Nd=3.

For example, in FIG. 4A the contiguous distributed virtual resource blocks indexed 1 and 2 are allocated to a single mobile telephone 3 for Nd=2. Thus, the mobile telephone 3 uses physical resource blocks indexed 1 and 2 to transmit the first part of the sub-frame and physical resource blocks indexed 49 and 50 to transmit the second part. Similarly, in FIG. 4B, the single distributed virtual resource block indexed 32 is allocated to a mobile telephone 3 for Nd=3. In this case the mobile telephone 3 uses the physical resource block indexed 32 to transmit the first part of the sub-frame, physical resource block indexed 64 to transmit the second part of the sub-frame, and physical resource block indexed 0 to transmit the third part of the sub-frame.

Advantageously, therefore, the same equation is used for determining the gap size for both Nd=2 and Nd=3 to efficiently determine the physical resource blocks onto which a particular distributed virtual resource block is mapped. It will be appreciated however, that whilst the gap size used for mapping distributed virtual resource blocks onto physical resource blocks has been described in terms of an equation, any suitable method for implementing the same mapping may be used. For example, the base station 5 (and/or the mobile telephone 3) may be programmed to look up the correct gap value in a lookup table stored in a local memory area.

It will be appreciated that for smaller bandwidths (for example 1.4 MHz and 3 MHz) the allocated distributed virtual resource blocks may be restricted to those mapped onto 2 two physical resource blocks (Nd=2) only. For larger bandwidths distributed virtual resource blocks comprising two or three physical resource blocks (Nd=2 or Nd=3) may be allocated.

Resource Allocation Module Operation (Base Station)

Figure 5:
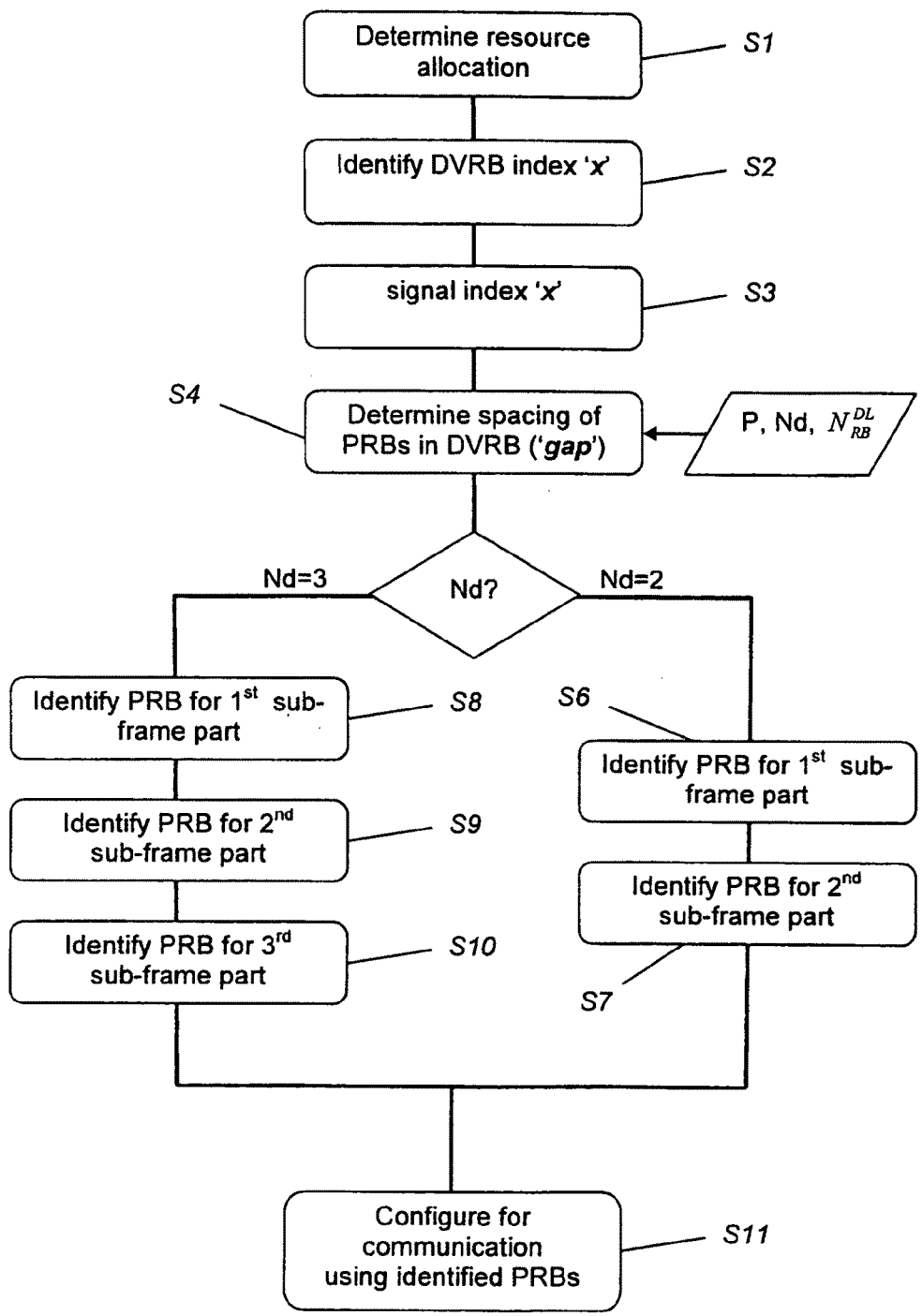
FIG. 5 is a flow chart illustrating the processing carried out by a resource allocation and a mapping module forming part of the base station shown in FIG. 3.

FIG. 5 is a flow chart illustrating the main processing steps carried out by the resource allocation module 33 of the base station 5 in conjunction with the mapping module 35 to determine the distributed virtual resource allocation for the different mobile telephones 3 scheduled for a current time point. As shown, in step S1, the resource allocation module 33 determines the distributed virtual resource block allocation for a particular mobile telephone 3. In step S2, the allocation module 33 identifies the index value 'x' for the allocated distributed virtual resource block which, as described previously is the same as the index value of the physical resource block to be used for transmission of the first part of the sub-frame. In step S3, the allocation module 33 signals the index value of the allocated virtual resource block to the scheduled mobile telephone 3. In step S4 the mapping module 35 of the allocation module 35 begins to determine the physical resource blocks which the allocated distributed virtual resource block represents by determining the value of the spacing ('gap') to be applied to the index 'x' generally as described previously.

Depending on the number of physical resource blocks the allocated distributed virtual resource represents the mapping module then determines the actual physical resources for communication. In the case of Nd=2, in step S6 the mapping module 33 identifies the physical resource block for the first part of the sub-frame. As described previously this is the physical resource block having the same index as the allocated virtual resource block. Then at step S7 the mapping module 33 identifies the physical resource block for the second part of the sub-frame by applying the value of the spacing determined in step S4. In the case of Nd=3, the process is broadly similar with the physical resource block for the first part of the sub-frame being identified at step S8 from the index value 'x'. The physical resource blocks for the second and third parts of the sub-frame are identified at steps S9 and S10 respectively by successive application of the spacing determined at step S4.

When all the allocated resource blocks have been identified the resource allocation module 33 initiates configuration of the base station, in step S11, for communication using the resource blocks identified for each part of the sub-frame.

Mobile Telephone

Figure 6:
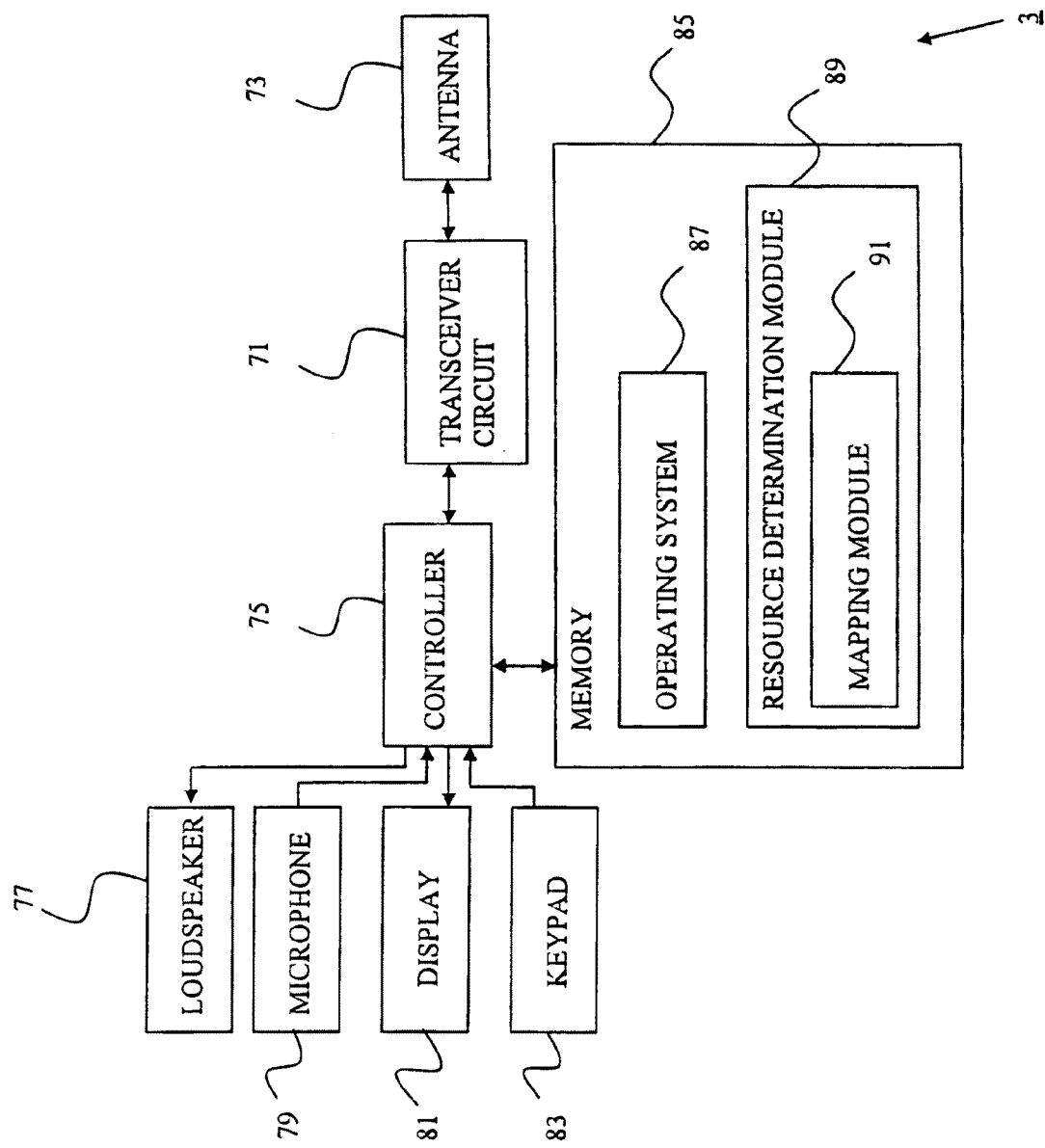
FIG. 6 is a block diagram illustrating the main components of one of the mobile telephones shown in FIG. 1.

FIG. 6 schematically illustrates the main components of each of the mobile telephones 3 shown in FIG. 1. As shown, the mobile telephones 3 include a transceiver circuit 71 which is operable to transmit signals to and to receive signals from the base station 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87 and a resource determination module 89. The resource determination module 89 includes a mapping module 91 which is operable to decode the resource allocation data signalled from the base station 5 to determine that mobile telephone's physical resource block allocation for a particular part of the sub-frame.

Resource Determination Module Operation (Mobile Telephone)

Figure 7:
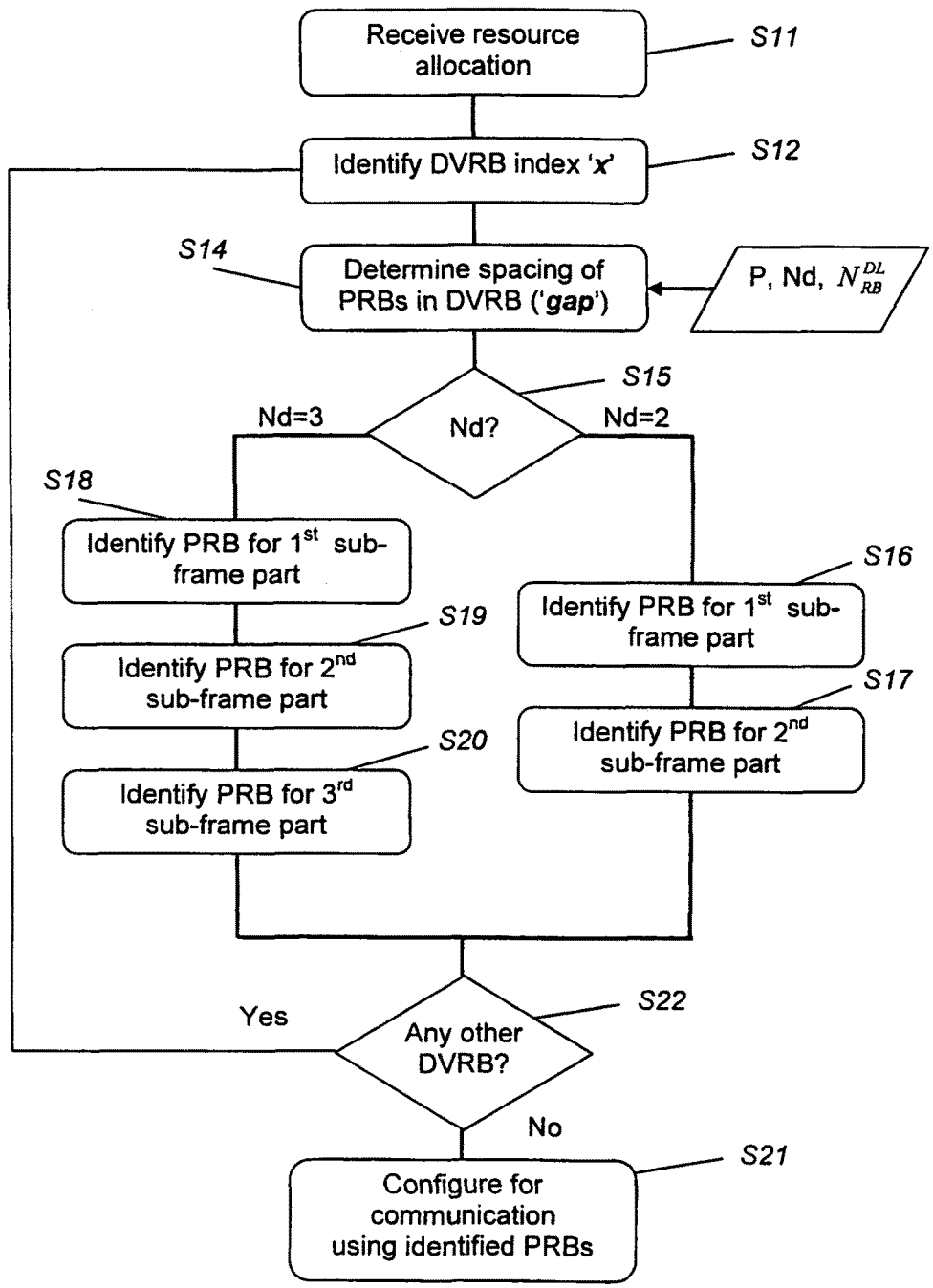
FIG. 7 is a flow chart illustrating the main processing steps carried out by a resource determination module and a mapping module forming part of the mobile telephone shown in FIG. 6.

FIG. 7 is a flow chart illustrating the main processing steps carried out by the resource determination module 89 of a mobile telephone 3, in conjunction with the mapping module 91, to determine the distributed virtual resource allocated to it. As shown, in step S11, the resource determination module 89 receives the distributed virtual resource block allocation signalled by the base station. In step S12, the resource determination module 89 derives the index value 'x' for the allocated distributed virtual resource block which, as described previously is the same as the index value of the physical resource block to be used for transmission of the first part of the sub-frame. In step S4 the mapping module 91 of the determination module 89 begins to determine the physical resource blocks which the allocated distributed virtual resource block represents by determining the value of the spacing ('gap') to be applied to the index 'x' generally as described previously.

Depending on the number of physical resource blocks the allocated distributed virtual resource represents the mapping module 91 then determines the actual physical resources for communication. In the case of Nd=2, in step S16 the mapping module 91 identifies the physical resource block for the first part of the sub-frame. As described previously this is the physical resource block having the same index as the allocated virtual resource block. Then at step S17 the mapping module 91 identifies the physical resource block for the second part of the sub-frame by applying the value of the spacing determined in step S14. In the case of Nd=3, the process is broadly similar with the physical resource block for the first part of the sub-frame being identified at step S18 from the index value 'x'. The physical resource blocks for the second and third parts of the sub-frame are identified at steps S19 and S20 respectively by successive application of the spacing determined at step S14.

Where a contiguous virtual resource block has been allocated the resource determination module 89 repeats the process from steps S12 to S22 for each of the virtual resource blocks in the contiguous block.

When all the allocated resource blocks have been identified the resource determination module 91 initiates configuration of the mobile telephone, in step S21, for communication using the resource blocks identified for each part of the sub-frame.

Modifications and Alternatives

A number of detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above embodiments, a mobile telephone based telecommunication system was described in which the above described resource allocation techniques were employed. As those skilled in the art will appreciate, the signalling of such resource allocation data can be employed in any communication system that uses a plurality of sub-carriers. In particular, the signalling techniques described above can be used in wire or wireless based communications either using electromagnetic signals or acoustic signals to carry the data. In the general case, the base station would be replaced by a communication node which communicates with a number of different user devices. For example, while the term 'mobile telephone' has been used throughout the description the methods and apparatus described are equally applicable to any mobile communication devices, for example, personal digital assistants, laptop computers, web browsers, etc.

In the above embodiments, the base station was assumed to have an operating bandwidth of 20 MHz and each resource block included 12 sub-carriers. As those skilled in the art will appreciate, the invention is not limited to this particular size of bandwidth or resource block size or to the frequency spacing of the sub-carriers described.

In the encoding techniques described above, a mapping was defined between the allocated virtual resource block and the physical resource blocks it represented. As those skilled in the art will appreciate, this mapping may be defined in any appropriate way, such as using an equation or using a lookup table. The use of an equation is preferred as it removes the need to store a lookup table both in the base station 5 and in each of the mobile telephones 3. Although the equations described above are preferred due to their simplicity, other equations may be used to define this mapping.

In the above embodiments, the allocation of a plurality of contiguous virtual resource blocks was described. As those skilled in the art will appreciate, a plurality of non-contiguous virtual resource blocks may similarly be allocated.

In the above embodiments, a number of software modules were described. As those skilled will appreciate, the software modules may be provided in compiled or un-compiled form and may be supplied to the base station or to the mobile telephone as a signal over a computer network, or on a recording medium. Further, the functionality performed by part or all of this software may be performed using one or more dedicated hardware circuits. However, the use of software modules is preferred as it facilitates the updating of base station 5 and the mobile telephones 3 in order to update their functionalities.

The following is a detailed description of the way in which the present inventions may be implemented in the currently proposed 3GPP LTE standard. Whilst various features are described as being essential or necessary, this may only be the case for the proposed 3GPP LTE standard, for example due to other requirements imposed by the standard. These statements should not, therefore, be construed as limiting the present invention in any way.

1 INTRODUCTION

In the last meeting RAN1#51Bis, some agreements were reached about the assignment of Nd PRB-pairs to which a DVRB pair is mapped [7]. However, the details of the exact mapping remain to be discussed.

In this contribution, we discuss a mechanism for mapping the DVRBs to PRBs with Nd=2 and Nd=3.

2 DVRB TO PRB MAPPING

Distributed transmission can use either Nd=2 or Nd=3.

We propose that for Nd=2, if a UE is assigned a DVRB-pair x, then the mapped Nd PRBs are located at PRB index x and (x+gap)mod 2*gap. Similarly, for Nd=3, if a UE is assigned a DVRB-triplet x, then the Nd PRBs are located at PRB index x, (x+gap)mod 3*gap and (x+2*gap)mod 3*gap. The value of gap is a function of Nd and the total number of PRBs in the system bandwidth $N_{RB}^{DL}$.

In the last meeting RAN1#51Bis, there was a desire to keep the Nd PRBs associated with a DVRB-pair or DVRB-triplet within one Resource Block Group (RBG) subset for a given UE. (However, it should still be possible for different UEs to be allocated in different RBG subsets using distributed transmission).

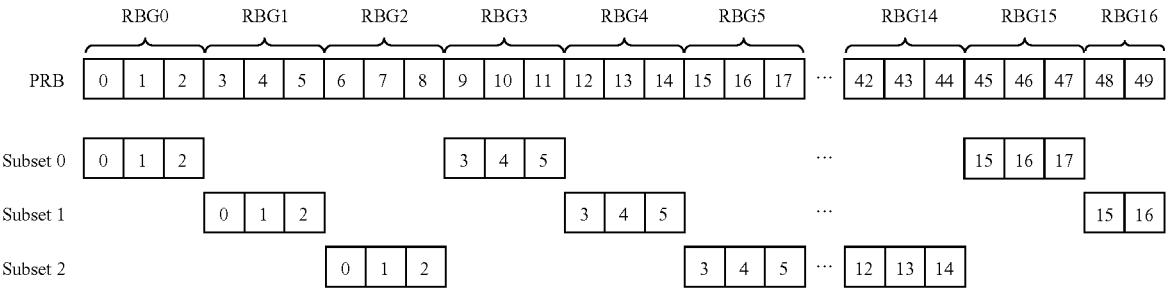

APPENDIX 1

Subset Configurations in 10 MHz Bandwidth

Based on that desire/requirement, the gap values need to be carefully calculated to keep a DVRB-pair or DVRB-triplet within one RBG subset. Specifically, gap should be a multiple of $P^2$ where P is the RBG size given in [8]. The gap can be calculated as follows:

$$gap = \left\lfloor \frac{G}{N_d} \right\rfloor * P^2 \qquad (1)$$

Where $G = \left\lceil \frac{N_{RB}^{DL}}{P^2} \right\rceil$.

This is shown in Appendix 2.

APPENDIX 2

PRB Spacing

| System bandwidth, MHz | $N_{RB}^{DL}$ | P | gap (Nd = 2) | gap (Nd = 3) |
|---|---|---|---|---|
| 1.4 | 6 | 1 | 3 | 2 |
| 3 | 15 | 2 | 8 | 4 |

-continued

| System bandwidth, MHz | $N_{RB}^{DL}$ | P | gap (Nd = 2) | gap (Nd = 3) |
|---|---|---|---|---|
| 5 | 25 | 2 | 12 | 8 |
| 10 | 50 | 3 | 27 | 18 |
| 15 | 75 | 4 | 32 | 16 |
| 20 | 100 | 4 | 48 | 32 |

The eNodeB assigns a DVRB to each UE as a value x in the range 0 to Nd*gap−1. The value x indicates the PRB in which the UE should transmit the first part of the sub-frame. The UE finds the PRB used to transmit the second part of the sub-frame (and third part in the case of Nd=3) by applying offsets of gap to x as described above.

The eNodeB may also assign a contiguous block of DVRBs to a given UE, in which case the corresponding PRBs can be obtained by applying the method described above to each assigned DVRB.

In the case that $N_d gap < N_{RB}^{DL}$, PRBs $N_d gap$ to $N_{RB}^{DL}-1$ cannot be used for distributed transmission. In the case that $N_d gap > N_{RB}^{DL}$, the eNodeB must not allocate DVRBs that would result in the condition $(x \bmod gap)+(N_d-1)gap < N_{RB}^{DL}$ not being satisfied.

Appendix 3 and 4 show an example for Nd=2 and Nd=3 respectively for the 20 MHz system bandwidth case. On these figures, different colors represent different UEs' assignments for distributed transmission. It is clear from these assignments that all the PRBs allocated to a particular UE are in the same RBG subset on the different parts of Nd=2/3.

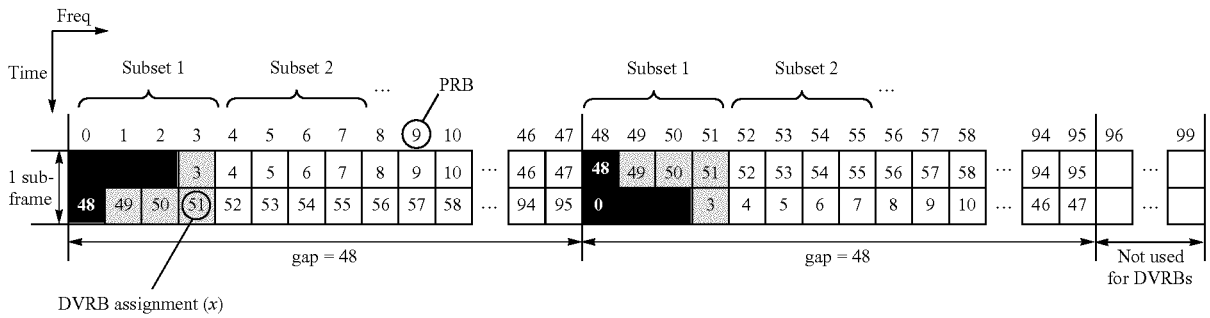

APPENDIX 3

Keeping a DVRB-Pair within One RBG Subset for Nd=2 in 20 MHz Bandwidth

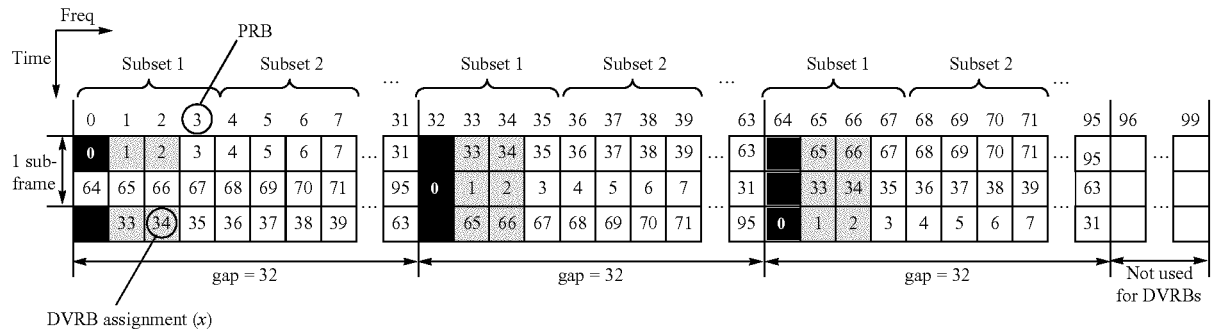

APPENDIX 4

Keeping a DVRB-Triplet within One RBG Subset for Nd=3 in 20 MHz

3 CONCLUSIONS

In this contribution, we have discussed a mechanism for mapping the DVRBs to PRBs with Nd=2 and Nd=3. In order to keep a DVRB-pair or DVRB-triplet within one RBG subset for a UE, and to maximise the number of assignable RBs for distributed transmission, the following equation is proposed to calculate the gap values:

$$gap = \left\lfloor \frac{G}{N_d} \right\rfloor * P^2$$

Where $G = \left\lceil \frac{N_{RB}^{DL}}{P^2} \right\rceil$ and P is the RBG size.

It is also proposed to use Nd=2 for all bandwidths and Nd=3 from 5 MHz to 20 MHZ bandwidths.

4 REFERENCES

[1] R1-070874, "Downlink Distributed Resource Block Mapping", NEC, NTT DoCoMo.
[2] R1-072946, "RB-level Distributed Transmission Method for Shared Data Channel in E-UTRA Downlink", NTT DoCoMo, Fujitsu, KDDI, Sharp, Toshiba Corporation.
[3] R1-070881, "Uplink Resource Allocation for EUTRA" NEC Group, NTT DoCoMo.
[4] R1-072826, "DL Distributed Resource Signalling for EUTRA", NEC
[5] R1-074602, "Downlink DVRB email reflector summary", Motorola
[6] R1-075056, "Way forward Resource allocation for Compact DL grant", NEC, et al.
[7] R1-080571, "Outcome from ad hoc session on DVRB", Motorola
[8] TS 36.213 V8.1.0

This application is based upon and claims the benefit of priority from United Kingdom patent application No. 0802117.2, filed on Feb. 5, 2008, the disclosure of which is incorporated herein in its entirety by reference.

The invention claimed is:

1. A method of allocating resources in a communication system which uses a plurality of sub-carriers arranged in a sequence of physical resource blocks wherein adjacent blocks of said sequence are arranged in groups, the method comprising, in a base station:
   determining at least one virtual resource block for allocation to a mobile communications device;
   signalling data identifying each virtual resource block to said mobile communications device; and
   mapping each allocated virtual resource block, using predetermined mapping data, onto a plurality of spaced physical resource blocks to determine the physical resource blocks to be used for communications with the mobile communications device;
   wherein said predetermined mapping data is such that said mapping causes the spacing between the mapped physical resource blocks to be an integer multiple of the square of the number of physical resource blocks in each group,
   wherein said signalled data represents a physical resource block to be used for a first part of a sub-frame,
   wherein at least part of said predetermined mapping data defines an equation for the location of a further physical resource block to be used for a further part of the sub-frame, and
   wherein the equation from which can be derived the location of a further physical resource block can be represented as follows:

$I_{PRB}=(x+gap) \bmod 2*gap$ where $I_{PRB}$ is the index of the further physical resource block, x is the index of the first physical resource block and gap is the spacing.

2. A method according to claim 1, wherein said predetermined mapping data defines the spacing to be a function of the number of physical resource blocks represented by the virtual resource block.

3. A method according to claim 1, wherein said predetermined mapping data defines the spacing to be a function of the number of physical resource blocks in said sequence.

4. A method according to claim 1, wherein at least part of said predetermined mapping data defines a look-up table.

5. A method according to claim 1, wherein said signalled data represents an index of the allocated virtual resource block.

6. A method of allocating resources in a communication system which uses a plurality of sub-carriers arranged in a sequence of physical resource blocks wherein adjacent blocks of said sequence are arranged in groups, the method comprising, in a base station:
determining at least one virtual resource block for allocation to a mobile communications device;
signalling data identifying each virtual resource block to said mobile communications device; and
mapping each allocated virtual resource block, using predetermined mapping data, onto a plurality of spaced physical resource blocks to determine the physical resource blocks to be used for communications with the mobile communications device,
wherein said predetermined mapping data is such that said mapping step causes the spacing between the mapped physical resource blocks to be an integer multiple of the square of the number of physical resource blocks in each group,
wherein at least part of said predetermined mapping data defines an equation for the spacing,
wherein said equation for the spacing is:

$$gap = \left\lfloor \frac{G}{Nd} \right\rfloor * P^2$$

where $G = \left\lceil \frac{N_{RB}^{DL}}{P^2} \right\rceil$ wherein gap is the spacing, P is the number of physical resource blocks in each group, Nd is the number of physical resource blocks which the virtual resource block represents, $N_{RB}^{DL}$ is the number of physical resource blocks in the sequence, $\lfloor \; \rfloor$ is the floor function and $\lceil \; \rceil$ is the ceiling function.

7. A method of allocating resources in a communication system which uses a plurality of sub-carriers arranged in a sequence of physical resource blocks wherein adjacent blocks of said sequence are arranged in groups, the method comprising, in a base station:
determining at least one virtual resource block for allocation to a mobile communications device;
signalling data identifying each virtual resource block to said mobile communications device; and
mapping each allocated virtual resource block, using predetermined mapping data, onto a plurality of spaced physical resource blocks to determine the physical resource blocks to be used for communications with the mobile communications device,
wherein said predetermined mapping data is such that said mapping step causes the spacing between the mapped physical resource blocks to be an integer multiple of the square of the number of physical resource blocks in each group,
wherein said signalled data represents a physical resource block to be used for a first part of a sub-frame,
wherein at least part of said predetermined mapping data defines an equation for the location of a further physical resource block to be used for a further part of the sub-frame, and
wherein the equation for the location of a further physical resource block is:

$$I_{PRB}=(x+(q-1)*gap) \bmod Nd*gap$$

where $I_{PRB}$ is the index of the further physical resource block, x is the index of the first physical resource block, gap is the spacing, Nd is the number of physical resource blocks which the virtual resource block represents, and q equals two for a second part of the sub-frame and three for a third part of the sub-frame.

8. A method performed by a mobile communications device which operates in a communication system that uses a plurality of sub-carriers arranged in a sequence of physical resource blocks, wherein adjacent blocks of said sequence are arranged in groups, the method comprising:
receiving data identifying one or more virtual resource blocks allocated to the mobile communications device; and
mapping each allocated virtual resource block, using predetermined mapping data, onto a plurality of spaced physical resource blocks to determine the physical resource blocks to be used for communications with a base station;
wherein said predetermined mapping data is such that said mapping causes the spacing between the mapped physical resource blocks to be an integer multiple of the square of the number of physical resource blocks in each group,
wherein said received data represents an index of a physical resource block to be used for a first part of a sub-frame,
wherein at least part of said predetermined mapping data defines an equation for the location of a further physical resource block to be used for a further part of the sub-frame, and
wherein the equation for the location of a further physical resource block can be represented as follows:

$$I_{PRB}=(x+gap) \bmod 2*gap$$

where $I_{PRB}$ is the index of the further physical resource block, x is the index of the first physical resource block and gap is the spacing.

9. A method according to claim 8, wherein said predetermined mapping data defines the spacing to be a function of the number of physical resource blocks represented by the virtual resource block.

10. A method according to claim 8, wherein said predetermined mapping data defines the spacing to be a function of the number of physical resource blocks in said sequence.

11. A method according to claim 8, wherein at least part of said predetermined mapping data defines a look-up table.

12. A method according to claims 8, wherein said received data represents an index of the allocated virtual resource block.

13. A method performed by a mobile communications device which operates in a communication system that uses a plurality of sub-carriers arranged in a sequence of physical resource blocks, wherein adjacent blocks of said sequence are arranged in groups, the method comprising:
receiving data identifying one or more virtual resource blocks allocated to the mobile communications device; and
mapping each allocated virtual resource block, using predetermined mapping data, onto a plurality of spaced physical resource blocks to determine the physical resource blocks to be used for communications with a base station, wherein said predetermined mapping data is such that said mapping step causes the spacing between the mapped physical resource blocks to be an integer multiple of the square of the number of physical resource blocks in each group, wherein at least part of said predetermined mapping data defines an equation for the spacing, and wherein equation for the spacing is:

$$gap = \left\lfloor \frac{G}{Nd} \right\rfloor * P^2$$

$$\text{where } G = \left\lceil \frac{N_{RB}^{DL}}{P^2} \right\rceil$$

wherein gap is the spacing, P is the number of physical resource blocks in each group, Nd is the number of physical resource blocks which the virtual resource block represents, $N_{RB}^{DL}$ is the number of physical resource blocks in the sequence, $\lfloor \ \rfloor$ is the floor function and $\lceil \ \rceil$ is the ceiling function.

14. A method performed by a mobile communications device which operates in a communication system that uses a plurality of sub-carriers arranged in a sequence of physical resource blocks, wherein adjacent blocks of said sequence are arranged in groups, the method comprising:

receiving data identifying one or more virtual resource blocks allocated to the mobile communications device; and mapping each allocated virtual resource block, using predetermined mapping data, onto a plurality of spaced physical resource blocks to determine the physical resource blocks to be used for communications with a base station, wherein said predetermined mapping data is such that said mapping step causes the spacing between the mapped physical resource blocks to be an integer multiple of the square of the number of physical resource blocks in each group;

wherein said received data represents an index of a physical resource block to be used for a first part of a sub-frame, wherein at least part of said predetermined mapping data defines an equation for the location of a further physical resource block to be used for a further part of the sub-frame, and wherein the equation for the location of a further physical resource block is:

$$I_{PRB}=(x+(q-1)*gap) \bmod Nd*gap$$

where $I_{PRB}$ is the index of the further physical resource block, x is the index of the first physical resource block, gap is the spacing, Nd is the number of physical resource blocks which the virtual resource block represents, and q equals two for a second part of the sub-frame and three for a third part of the sub-frame.

15. A base station for use in a communication system which uses a plurality of sub-carriers arranged in a sequence of physical resource blocks wherein adjacent blocks of said sequence are arranged in groups, the base station comprising:

a processor for determining at least one virtual resource block for allocation to a mobile communications device;

a transmitter for signalling data identifying each virtual resource block to said mobile communications device; and means for mapping each allocated virtual resource block, using predetermined mapping data, onto a plurality of spaced physical resource blocks to determine the physical resource blocks to be used for communications with the mobile communications device;

wherein said predetermined mapping data is such that said mapping means causes the spacing between the mapped physical resource blocks to be an integer multiple of the square of the number of physical resource blocks in each group, wherein said signalled data represents a physical resource block to be used for a first part of a sub-frame, wherein at least part of said predetermined mapping data defines an equation for the location of a further physical resource block to be used for a further part of the sub-frame, and wherein the equation from which can be derived the location of a further physical resource block can be represented as follows:

$$I_{PRB}=(x+gap) \bmod 2*gap$$

where $I_{PRB}$ is the index of the further physical resource block, x is the index of the first physical resource block and gap is the spacing.

16. A mobile communications device which operates in a communication system that uses a plurality of sub-carriers arranged in a sequence of physical resource blocks, wherein adjacent blocks of said sequence are arranged in groups, the mobile communications device comprising:

a receiver for receiving data identifying one or more virtual resource blocks allocated to the mobile communications device; and means for mapping each allocated virtual resource block, using predetermined mapping data, onto a plurality of spaced physical resource blocks to determine the physical resource blocks to be used for communications with a base station;

wherein said predetermined mapping data is such that said mapping means causes the spacing between the mapped physical resource blocks to be an integer multiple of the square of the number of physical resource blocks in each group, wherein said received data represents an index of a physical resource block to be used for a first part of a sub-frame, wherein at least part of said predetermined mapping data defines an equation for the location of a further physical resource block to be used for a further part of the sub-frame, and wherein the equation for the location of a further physical resource block can be represented as follows:

$$I_{PRB}=(x+gap) \bmod 2*gap$$

where $I_{PRB}$ is the index of the further physical resource block, x is the index of the first physical resource block and gap is the spacing.

17. A method performed by a communications device which operates in a communication system that uses a plurality of sub-carriers arranged in a sequence of physical resource blocks, wherein adjacent blocks of said sequence are arranged in groups, the method comprising:

obtaining data identifying one or more allocated virtual resource blocks; and mapping each allocated virtual resource block, using predetermined mapping data, onto a plurality of spaced physical resource blocks to determine the physical resource blocks to be used for communications;

wherein said predetermined mapping data is such that said mapping causes the spacing between the mapped physical resource blocks to be an integer multiple of the square of the number of physical resource blocks in each group, wherein said obtained data represents a physical resource block to be used for a first part of a sub-frame, wherein at least part of said predetermined mapping data defines an equation for the location of a further physical resource block to be used for a further part of the sub-frame, and wherein the equation from which can be derived the location of a further physical resource block can be represented as follows:

$$I_{PRB} = (x + \text{gap}) \bmod 2*\text{gap}$$

where $I_{PRB}$ is the index of the further physical resource block, x is the index of the first physical resource block and gap is the spacing.

18. A method according to claim 17, performed by a mobile communications device and wherein said obtaining comprises receiving the data identifying the one or more allocated virtual resource blocks.

19. A method according to claim 17, performed by a base station and wherein said obtaining comprises determining the data identifying the one or more allocated virtual resource blocks.

* * * * *